(12) United States Patent
Kodama

(10) Patent No.: US 6,728,014 B2
(45) Date of Patent: Apr. 27, 2004

(54) HOLOGRAM RECORDING FILM WITH ADDITIONAL INFORMATION AND RECORDING METHOD THEREFOR

(75) Inventor: Daijiro Kodama, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 61 days.

(21) Appl. No.: 10/214,336

(22) Filed: Aug. 8, 2002

(65) Prior Publication Data

US 2003/0030858 A1 Feb. 13, 2003

(30) Foreign Application Priority Data

Aug. 9, 2001 (JP) ......................................... 2001-241800

(51) Int. Cl.[7] .............................. G03H 1/04; G03H 1/20; G03H 1/28
(52) U.S. Cl. ............................. 359/12; 359/24; 359/33; 359/900
(58) Field of Search ................................ 359/2, 12, 24, 359/33, 900

(56) References Cited

U.S. PATENT DOCUMENTS 5,486,933 A  *  1/1996  Shindo et al. .................. 359/2
6,366,369 B2  *  4/2002  Ichikawa et al. ............. 359/12
6,613,481 B2  *  9/2003  Hamada ........................ 430/1

* cited by examiner

Primary Examiner—John Juba, Jr.
(74) Attorney, Agent, or Firm—Sughrue Mion, PLLC

(57) ABSTRACT

A hologram recording film has a hologram image of an object recorded in a volume hologram photosensitive material by holographic duplication and further has a hologram image of an additional information pattern, e.g. a character or an image, recorded superimposedly in the same volume hologram photosensitive material simultaneously with the holographic duplication so that the additional information pattern is reconstructable in a plane with a depth from the hologram plane. Reflection type additional information is recorded in the hologram recording film so as to be reconstructable simultaneously in superimposition with a reconstructed image from the volume hologram. In addition, transmission type additional information that is in mirror image relation to the reflection type additional information is recorded in the hologram recording film so as to be reconstructable simultaneously in superimposition with the reconstructed image from the volume hologram.

6 Claims, 4 Drawing Sheets

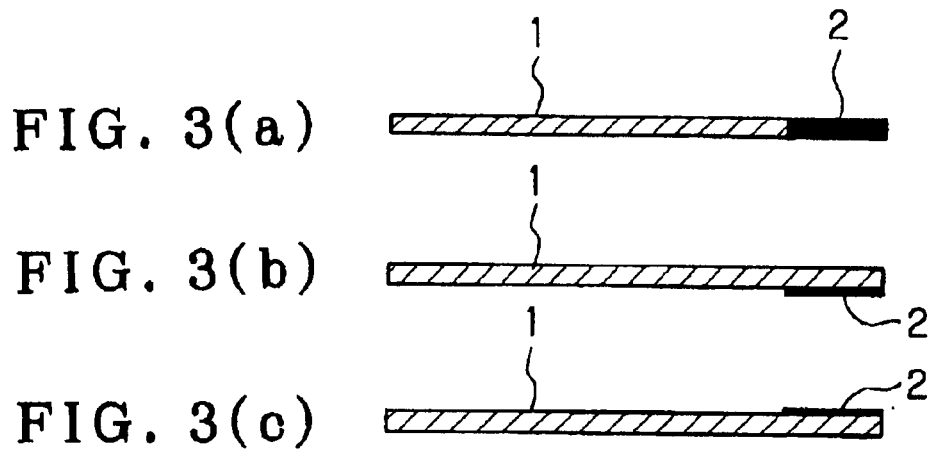
FIG. 3(a)
FIG. 3(b)
FIG. 3(c)
FIG. 4
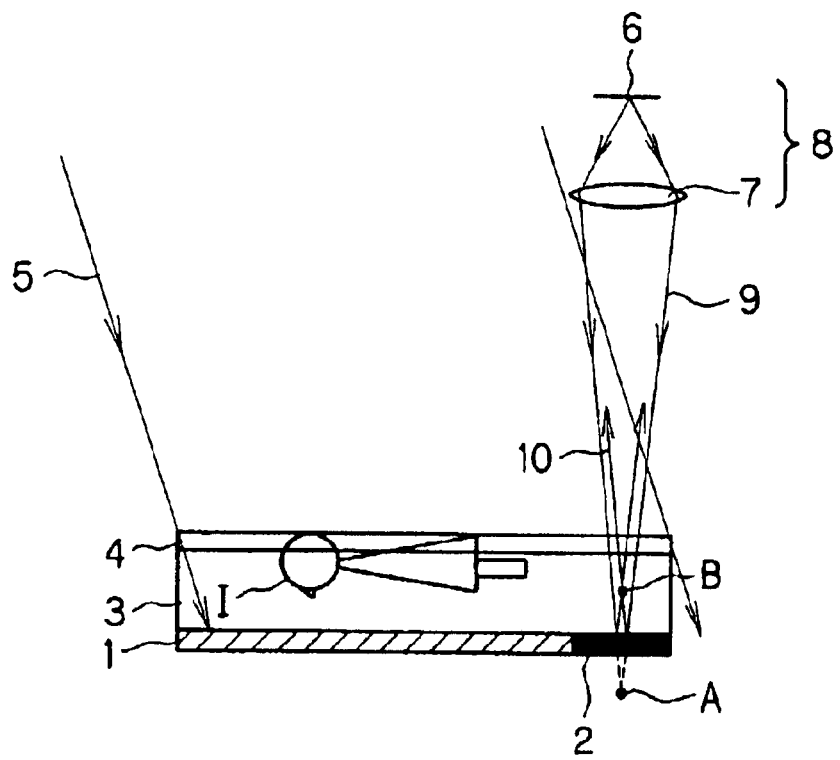

(a)

(b)

HOLOGRAM RECORDING FILM WITH ADDITIONAL INFORMATION AND RECORDING METHOD THEREFOR

BACKGROUND OF THE INVENTION

The present invention relates to a hologram recording film with additional information and also pertains to a recording method therefor. More particularly, the present invention relates to a hologram recording film having a reflection type volume hologram of a three-dimensional object or the like recorded therein, together with a plane pattern, e.g. a character or an image, recorded in superimposition with the volume hologram as individual information (variable information) concerning the associated hologram. The present invention also relates to a recording method for the hologram recording film.

To record a reflection type volume hologram, a volume hologram photosensitive material, e.g. a photopolymer, is placed in close contact with or in close proximity to a reflection type volume hologram original plate for duplication, and illuminating light for duplication is applied from the hologram photosensitive material side so that reflected and diffracted light from the reflection type volume hologram original plate and the incident light interfere with each other in the hologram photosensitive material, thereby duplicatively recording a reflection type volume hologram having the same characteristics as those of the reflection type volume hologram original plate. There have heretofore been known methods of adding variable information, e.g. a serial number, to each individual hologram made by holographic duplication. Such methods are disclosed, for example, in Japanese Patent Application Nos. Hei 3-5555 and Hei 10-56470. Japanese Patent Application No. Hei 3-5555 discloses a method wherein after an image reconstructed from a hologram original plate has been recorded in a hologram film by holographic duplication, a reflecting layer is placed at the rear of the hologram film. Incident light entering the hologram film and the reflected incident light from the reflecting layer are allowed to interfere with each other in the hologram film, thereby recording individual information therein. Japanese Patent Application No. Hei 10-56470 discloses a method wherein a reflection type liquid crystal mask is provided in the vicinity of a hologram of a hologram original plate that is to be duplicated, and additional information corresponding to a reflection pattern of the reflection type liquid crystal mask is recorded on a hologram photosensitive material at the same time as the hologram to be duplicated is recorded. In addition, Japanese Patent Application No. Hei 10-56470 discloses a method wherein a reflecting region is provided on a hologram original plate in the vicinity of a hologram to be duplicated, and light is applied to the reflecting region through a transmission type liquid crystal mask to record additional information corresponding to a transmission pattern of the transmission type liquid crystal mask on a hologram photosensitive material simultaneously with the hologram.

However, the method of Japanese Patent Application No. Hei 3-5555 suffers from such problems that individual information cannot be recorded at the same time as a hologram is recorded by duplication, and the image of the individual information appears only substantially in the hologram plane. The method of Japanese Patent Application No. Hei 10-56470 involves the following problems. When a transmission type liquid crystal mask is used, the mask needs to be brought into close contact with the surface of the hologram photosensitive material during exposure process. This causes the duplicating system to become unfavorably complicated, resulting in an increase in the system cost. In addition, the process time lengthens undesirably. When a reflection type liquid crystal mask is used, it is necessary to prepare a reflection type liquid crystal mask for each hologram original plate. Hence, the original plate cost increases unfavorably.

SUMMARY OF THE INVENTION

The present invention was made in view of the above-described circumstances of the prior art.

An object of the present invention is to provide a hologram recording film having a hologram image of an object recorded in a volume hologram photosensitive material by holographic duplication and further having a hologram image of an additional information pattern, e.g. a character or an image, recorded superimposedly in the same volume hologram photosensitive material simultaneously with the holographic duplication so that the additional information pattern is reconstructable in a plane with a depth from the hologram plane, and also provide a recording method for the hologram recording film.

To attain the above-described object, the present invention provides a hologram recording film with additional information. The hologram recording film has a reflection type volume hologram recorded therein. Reflection type additional information has been recorded in the hologram recording film so as to be reconstructable simultaneously in superimposition with a reconstructed image from the volume hologram. In addition, transmission type additional information that is in mirror image relation to the reflection type additional information has been recorded in the hologram recording film so as to be reconstructable simultaneously in superimposition with the reconstructed image from the volume hologram.

In this case, the reflection type additional information and the transmission type additional information may be recorded so as to be reconstructable at a position either different from or the same as the hologram plane.

The hologram recording film may be recorded so that a full-color image is reconstructable.

In addition, the present invention provides a recording method for a hologram recording film with additional information. In this aspect, the present invention is applied to a recording method wherein a hologram photosensitive material is placed at a distance from a reflection type volume hologram original plate for forming an object image, and duplicating illuminating light for duplicating the reflection type volume hologram original plate is applied from the hologram photosensitive material side so that diffracted light from the reflection type volume hologram original plate and the duplicating illuminating light interfere with each other in the hologram photosensitive material, thereby recording a reflection type volume hologram in the hologram photosensitive material. According to the present invention, a mirror or a reflective diffuser is disposed on a part of the reflection type volume hologram original plate, and projection light projecting an additional information pattern illuminated with light from the same light source as that of the duplicating illuminating light is applied to the mirror or reflective diffuser through the hologram photosensitive material. Light reflected or diffused by the mirror or reflective diffuser and the duplicating illuminating light are allowed to interfere with each other in the hologram photosensitive material, thereby superimposedly recording a reflection hologram in the hologram photosensitive material. In addition, the projection light and the duplicating illuminating light are allowed to interfere with each other in the hologram photosensitive material, thereby superimposedly recording a transmission hologram in the hologram photosensitive material.

The above-described recording method may be as follows. The reflection type volume hologram original plate is a multi-recorded hologram original plate having a plurality of juxtaposed holograms. A mirror or a reflective diffuser is disposed on a part of each hologram of the reflection type volume hologram original plate, and projection light projecting an additional information pattern illuminated with light from the same light source as that of the duplicating illuminating light is simultaneously applied to the mirror or reflective diffuser on a part of each hologram of the reflection type volume hologram original plate through the hologram photosensitive material. Light reflected or diffused by the mirror or reflective diffuser of each hologram of the reflection type volume hologram original plate and the duplicating illuminating light are allowed to interfere with each other in the hologram photosensitive material, thereby superimposedly recording a reflection hologram in the hologram photosensitive material. In addition, the projection light and the duplicating illuminating light are allowed to interfere with each other in the hologram photosensitive material, thereby superimposedly recording a transmission hologram in the hologram photosensitive material.

In the present invention, reflection type additional information is recorded so as to be reconstructable simultaneously in superimposition with a reconstructed image from a volume hologram. In addition, transmission type additional information that is in mirror image relation to the reflection type additional information is recorded so as to be reconstructable simultaneously in superimposition with the reconstructed image from the volume hologram. Therefore, the additional information is surely visible. In addition, the additional information can be recorded so as to be reconstructable at any desired position with respect to the hologram plane. Further, because the additional information is recorded as both reflection type and transmission type additional information, it becomes easy to judge whether the hologram product is authentic or not. Furthermore, the present invention allows additional information, e.g. individual information (variable information), to be recorded by making only a simple change to the setup used for the conventional hologram duplicating method.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIGS. 3(a), 3(b) and 3(c) are diagrams for explaining the way in which a reflecting surface is disposed with respect to the reflection hologram original plate in FIG. 1.

FIG. 4 is a diagram for explaining a case where the projection point of a projection apparatus has been changed with respect to the setup shown in FIG. 1.

DESCRIPTION OF THE PREFERRED EMBODIMENTS

The hologram recording film with additional information provided by the present invention will be described below according to the recording method therefor.

The recording method for a hologram recording film according to the present invention is as follows. When a reflection hologram is recorded from a reflection hologram original plate by holographic duplication so that the reflection hologram has approximately the same characteristics as those of the original plate, light carrying an additional information pattern that is projected by a projection apparatus illuminated with light from the same light source as that of duplicating illuminating light is made incident from the hologram photosensitive material side so that the incident light illuminates a mirror or a reflective diffuser disposed on a part of the reflection hologram original plate, thereby holographically recording the additional information pattern in the hologram photosensitive material at the same time as an object image recorded in the reflection hologram original plate is recorded in the hologram photosensitive material.

Figure 1:
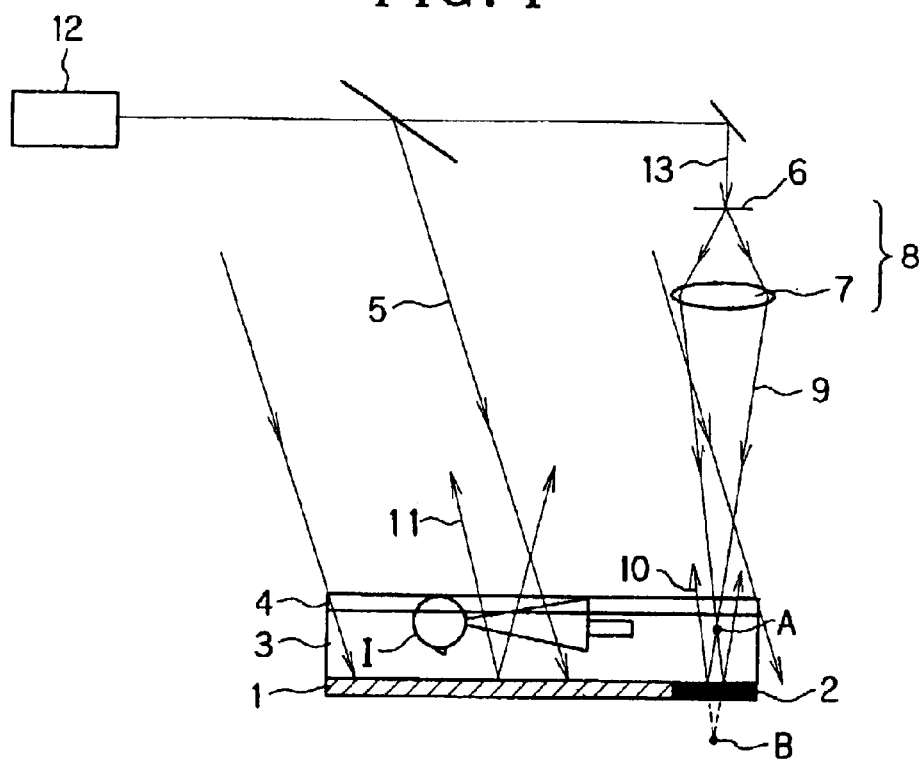
FIG. 1 is a diagram showing a basic setup for adding variable information to each individual reflection type volume hologram when duplicatively recorded from a reflection hologram original plate according to the present invention.

FIG. 1 is a diagram showing a basic setup for adding variable information, e.g. a serial number, to each individual reflection type volume hologram according to the present invention when it is duplicatively recorded from a reflection type volume hologram original plate so that the volume hologram has approximately the same characteristics as those of the original plate. In the figure, reference numeral 1 denotes a reflection type volume hologram original plate (hereinafter referred to as "reflection hologram original plate 1") wherein an image of a three-dimensional object, e.g. a three-dimensional model, has been recorded holographically. A reflecting surface 2 is disposed on a part of the reflection hologram original plate 1. Regarding the way in which the reflecting surface 2 is disposed, the reflecting surface 2 may be juxtaposed with the reflection hologram original plate 1, as shown in FIG. 3(a). The reflecting surface 2 may be laminated on the reverse or obverse side of a part of the reflection hologram original plate 1, as shown in FIGS. 3(b) and 3(c). It is also possible to form the reflecting surface 2 from a hologram mirror.

A transparent spacer 3 with a predetermined thickness is laminated on the reflection hologram original plate 1 provided with the reflecting surface 2, and a volume hologram photosensitive material 4, e.g. a photopolymer, is laminated on the transparent spacer 3.

A projection apparatus 8 is disposed at a position corresponding to the position of the reflecting surface 2 on the periphery of the reflection hologram original plate 1 at a side thereof from which duplicating illuminating light 5 is incident on the original plate 1. The projection apparatus 8 comprises a display unit 6 for displaying an additional information pattern, e.g. a character or an image, and a projection optical system 7.

With this setup, duplicating illuminating light 5 is made incident on the reflection hologram original plate 1 through the volume hologram photosensitive material 4 from a direction opposite to the direction of incidence of illuminating light at the time of making the reflection hologram original plate 1. Consequently, an image I of the three-dimensional object is formed at the position of the object at the time of recording the reflection hologram original plate 1 by reflected and diffracted light 11 from the reflection hologram original plate 1. The diffracted light 11 forming the object image I and the incident light (duplicating illuminating light) 5 interfere with each other in the volume hologram photosensitive material 4, whereby a reflection type volume hologram having approximately the same characteristics as those of the reflection hologram original plate 1 is duplicatively recorded in the volume hologram photosensitive material 4.

At the same time as the duplicating illuminating light 5 is made incident on the reflection hologram original plate 1, the display unit 6 of the projection apparatus 8 is illuminated with light 13 from the same light source 12 as that of the duplicating illuminating light 5, whereby the additional information pattern displayed on the display unit 6 is projected toward the reflecting surface 2. Projection light projecting the additional information pattern is denoted by reference numeral 9, and a point where the additional information pattern is projected is denoted by reference symbol A. In the case of FIG. 1, the projection apparatus 8 has been adjusted so that the projection point A is at a position between the volume hologram photosensitive material 4 and the reflection hologram original plate 1. However, the projection apparatus 8 may be adjusted so that the projection point A is at a side of the reflection hologram original plate 1 remote from the volume hologram photosensitive material 4, as shown in FIG. 4. The projection point A may be positioned in front of the volume hologram photosensitive material 4, that is, at a side thereof remote from the reflection hologram original plate 1. In the case of FIG. 1, after converging at the projection point A, the projection light 9 is reflected by the reflecting surface 2 and enters the volume hologram photosensitive material 4 from the reflection hologram original plate 1 side in the form of light 10 diverging from a position B where an image of the projection point A is formed by the reflecting surface 2. In the volume hologram photosensitive material 4, the light 10 diverging from the point B and the duplicating illuminating light 5 interfere with each other, whereby another reflection hologram is recorded superimposedly. In addition, the projection light 9 and the duplicating illuminating light 5, which are incident from the same side, interfere with each other, whereby a transmission hologram is also recorded superimposedly in the volume hologram photosensitive material 4.

Figure 2:
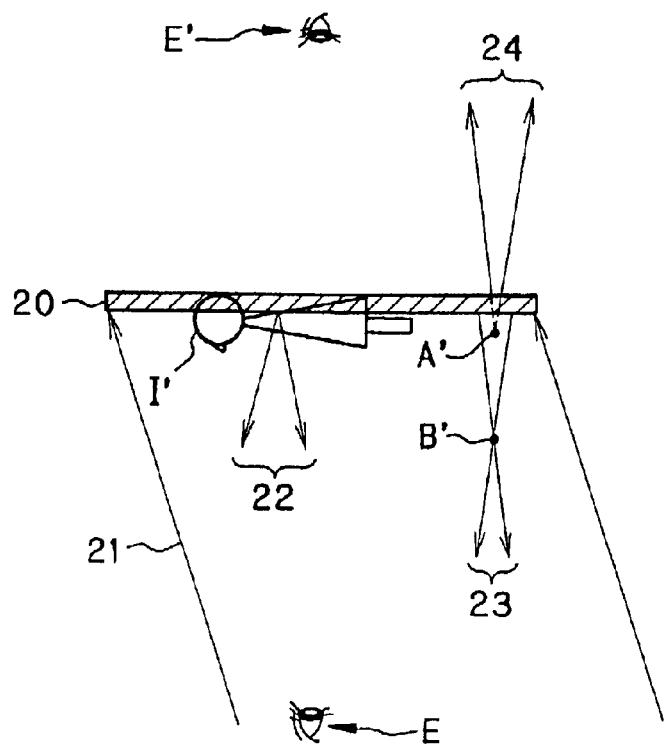
FIG. 2 is a diagram showing an optical path when a recorded image is reconstructed from a volume hologram duplicatively recorded by the setup as shown in FIG. 1.

FIG. 2 is a diagram showing an optical path when a recorded image is reconstructed from a volume hologram 20 duplicatively recorded in the volume hologram photosensitive material 4 as illustrated in FIG. 1. White illuminating light 21 is made incident on the volume hologram 20 from a direction opposite to the direction of incidence of the duplicating illuminating light 5 at the time of the duplicative recording. Consequently, diffracted light 22 reconstructs an image I' of the object image I in the vicinity of the plane of the volume hologram 20. At the same time, diffracted light 23 is generated from the reflection hologram recorded by the interference between the light 10 diverging from the point B during the recording process and the duplicating illuminating light 5. The diffracted light 23 once converges at a point B' corresponding to the divergence point B at the time of recording and then diverges from the point B. Thus, the additional information pattern displayed on the display unit 6 at the time of recording is reconstructed in the vicinity of the point B'. Accordingly, an observer's eye E at the reflection side of the volume hologram 20 can view the additional information pattern in a plane in the vicinity of the point B' simultaneously with the image I' of the object image I.

Meanwhile, when the white illuminating light 21 is made incident on the volume hologram 20, diffracted light 24 emerges to the transmission side of the volume hologram 20 from the transmission hologram recorded by the interference between the projection light 9 incident on the projection point A at the time of recording and the duplicating illuminating light 5, besides the above-described diffracted light 22 and diffracted light 23. The diffracted light 24 diverges from a point A' corresponding to the point A at which the projection light 9 converged at the time of recording. Thus, the additional information pattern displayed on the display unit 6 at the time of recording is also reconstructed in the vicinity of the point A'. Accordingly, an observer's eye E' at the transmission side of the volume hologram 20 can view the additional information pattern in a plane in the vicinity of the point A'.

It should be noted that the difference among the setups shown in FIGS. 1 and 4 and the setup (not shown) in which the projection apparatus 8 is adjusted so that the projection point A is in front of the volume hologram photosensitive material 4 is the position of the point B' at the time of reconstruction, i.e. whether the position of the point B' is near the volume hologram 20 (FIG. 4), or in a plane relatively away from the volume hologram 20 at the reflection side thereof (FIG. 2), or in a plane more away from the volume hologram 20 (not shown). Regarding the position of the point A' at the time of reconstruction, the difference is whether the point A' is near the volume hologram 20 (FIG. 2), or in a plane relatively away from the volume hologram 20 at the reflection side thereof (FIG. 4), or on the opposite side of the volume hologram 20 (not shown).

Thus, the reflection type volume hologram 20 made by holographic duplication has variable information, e.g. a serial number, added thereto so that the variable information is reconstructed in a plane away from the hologram plane and can be observed from both the reflection side and the transmission side. Therefore, the additional information is surely visible. Further, because the additional information is recorded as both reflection type and transmission type additional information, it becomes easy to judge whether the hologram product is authentic or not.

Figure 5A:
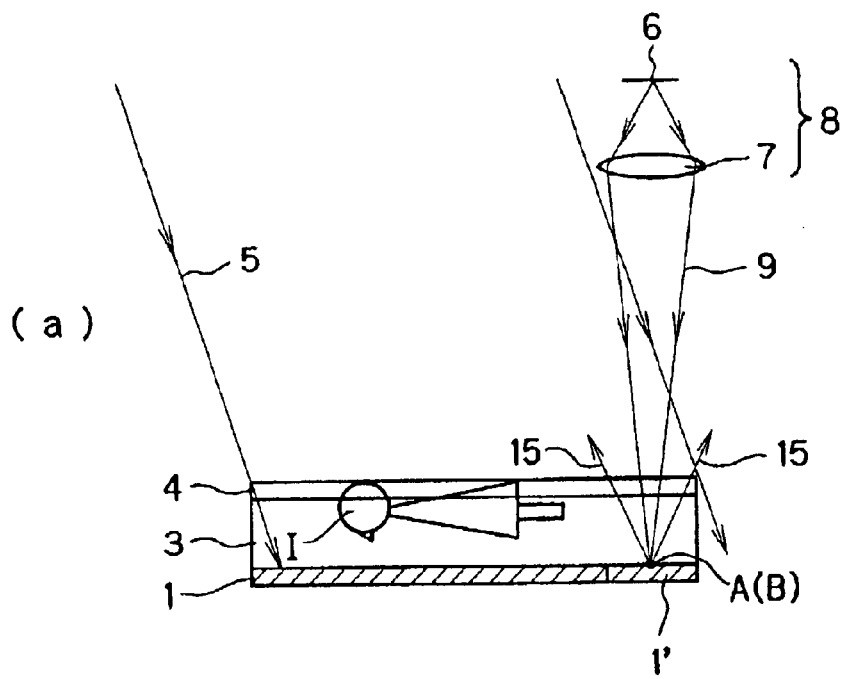
FIGS. 5(a) and 5(b) are diagrams respectively corresponding to FIGS. 1 and 2, illustrating another embodiment of the present invention.
Figure 5B:
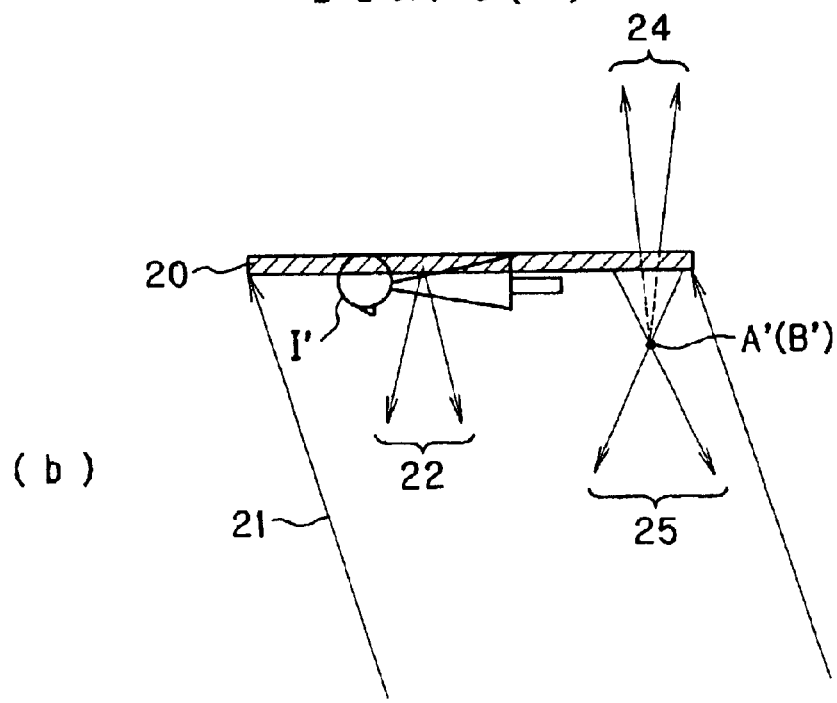

FIGS. 5(a) and 5(b) are diagrams for describing another embodiment of the present invention. FIG. 5(a) is a diagram corresponding to FIG. 1, showing a setup for adding variable information, e.g. a serial number, to each individual reflection type volume hologram when duplicatively recorded from a reflection hologram original plate. FIG. 5(b) is a diagram corresponding to FIG. 2, showing an optical path when a recorded image is reconstructed from a volume hologram 20 duplicatively recorded by the setup as shown in FIG. 5(a). In this embodiment, a diffusing surface 1' is disposed on a part of the reflection hologram original plate 1 instead of disposing the reflecting surface 2 on a part of the reflection hologram original plate 1 as in the embodiment shown in FIG. 1, and the projection apparatus 8 is adjusted so that the projection point A is in the vicinity of the diffusing surface 1'. The diffusing surface 1' provided on a part of the reflection hologram original plate 1 may be a reflective diffuser, e.g. ground glass or paper. Alternatively, the diffusing surface 1' may be a hologram with diffusing properties recorded on a part of the reflection hologram original plate 1. When a part of the reflection hologram original plate 1 has diffusing properties, it is not always necessary to dispose a special reflective diffuser or to record a hologram with diffusing properties. If recording is performed in the same way as in FIG. 1 with the setup as shown in FIG. 5(a), a reflection type volume hologram having approximately the same characteristics as those of the reflection hologram original plate 1 is duplicatively recorded in the volume hologram photosensitive material 4. At the same time, projection light 9 from the projection apparatus 8 is incident on the diffusing surface 1' while forming an image. Light 15 diffused from the diffusing surface 1' and the duplicating illuminating light 5 interfere with each other in the volume hologram photosensitive material 4, whereby another reflection hologram is recorded superimposedly in the volume hologram photosensitive material 4. In addition, the projection light 9 and the duplicating illuminating light 5, which are incident from the same side, interfere with each other, whereby a transmission hologram is also recorded superimposedly in the volume hologram photosensitive material 4 in the same way as in FIG. 1. In this case, the point A (projection point) and the point B (diffusing point of diffused light) are the same and on the diffusing surface 1'.

When white illuminating light 21 is made incident on the volume hologram 20 recorded by the setup shown in FIG. 5(a) in the same way as the above, diffracted light 22 reconstructs an image I' of the object image I in the vicinity of the plane of the volume hologram 20. At the same time, diffracted light 25 is generated from the reflection hologram recorded by the interference between the diffused light 15 from the diffusing surface 1' during the recording process and the duplicating illuminating light 5. The diffracted light 25 once converges in a plane [at the position of the point A' (B') corresponding to the point A (B)] corresponding to the position of the diffusing surface 1' at the time of recording and then diverges therefrom. Thus, the additional information pattern displayed on the display unit 6 at the time of recording is reconstructed in the vicinity of the point A' (B'). Accordingly, an observer's eye E at the reflection side of the volume hologram 20 can view the additional information pattern in a plane in the vicinity of the point A' (B') simultaneously with the image I' of the object image I. Meanwhile, diffracted light 24 emerges to the transmission side of the volume hologram 20 from the transmission hologram recorded by the interference between the projection light 9 incident on the projection point A (diffusing surface 1') at the time of recording and the duplicating illuminating light 5. The diffracted light 24 diverges from a point A' corresponding to the point A at which the projection light 9 converged at the time of recording. Thus, the additional information pattern displayed on the display unit 6 at the time of recording is also reconstructed in the vicinity of the point A' (B'). Accordingly, an observer's eye E' at the transmission side of the volume hologram 20 can view the additional information pattern in a plane in the vicinity of the point A' (B').

In the embodiment shown in FIG. 5, the reconstruction plane where the additional information pattern is reconstructed from both the reflection and transmission holograms is limited to the diffusing surface 1' at the time of recording. Therefore, the reconstruction plane cannot be changed as desired by adjusting the projection plane of the projection apparatus 8 as in FIGS. 1 and 4. This may be said to be the demerit point of this embodiment.

It should be noted that the additional information pattern seen to the observer's eye E and that seen to the observer's eye E' are in mirror image relation to each other in any of the foregoing arrangements.

Figure 6:
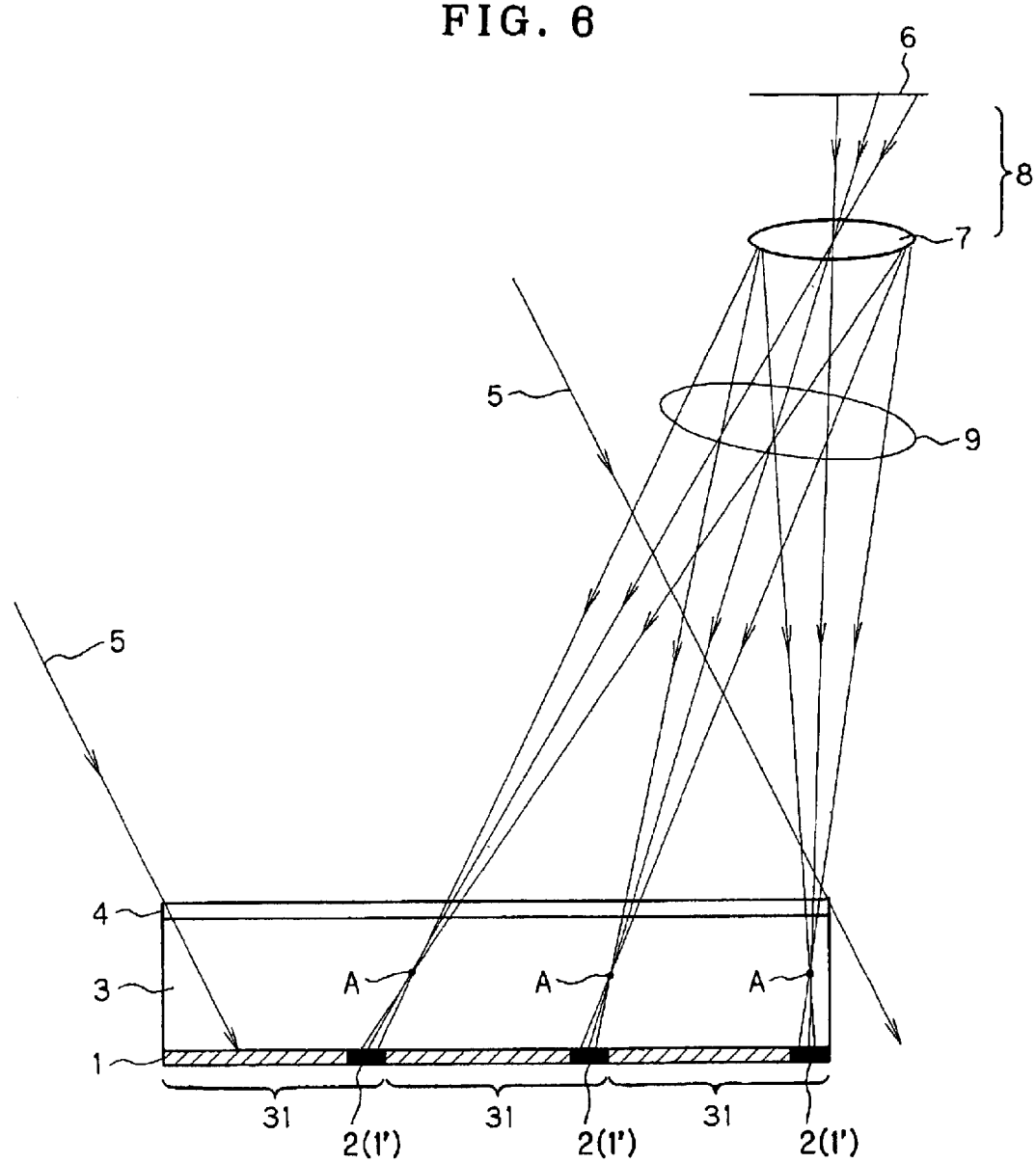
FIG. 6 is a diagram corresponding to FIG. 1, showing an arrangement in which a multi-recorded hologram original plate is used as a reflection hologram original plate.

Incidentally, either of the embodiments shown in FIGS. 1 and 5 may use a multi-recorded hologram original plate having a plurality of juxtaposed holograms as a reflection hologram original plate 1. That is, as shown in FIG. 6, a multi-recorded hologram original plate having a plurality of identical or different holograms 31 juxtaposed with each other may be used as a reflection hologram original plate 1 to duplicate the plurality of holograms 31 by a single holographic recording process. In such a case, a reflecting surface 2 or a diffusing surface 1' is provided on a part of each hologram 31 of the reflection hologram original plate 1. The projection apparatus 8 is arranged so that additional information patterns can be simultaneously projected onto the reflecting surfaces 2 or diffusing surfaces 1' of all the holograms 31 of the reflection hologram original plate 1. Thus, individual information (variable information) or common information is recorded superimposedly as an additional information pattern on each hologram of a multi-recorded hologram plate made by holographic duplication. As will be understood from the setup shown in FIG. 6, projection light 9 is incident at a relatively large angle of incidence on a hologram 31 relatively far away from the projection apparatus 8. Therefore, when the transparent spacer 3 is relatively thick, for example, light carrying an additional information pattern may undesirably enter a hologram adjacent to the desired hologram and add erroneous information thereto. In such a case, it is desirable to use a hologram mirror as the reflecting surface 2, which exhibits characteristics whereby the incident light is reflected in the forward direction.

In the foregoing embodiments, the display unit 6 of the projection apparatus 8 may be any display device capable of displaying an additional information pattern by illuminating it with light from the light source 12 of the duplicating illuminating light 5 simultaneously therewith. For example, a liquid crystal display device or a display device capable of mechanically changing aperture transmission patterns or reflection patterns may be used.

It is possible to record a full-color object image I' and a full-color additional information pattern in the volume hologram 20 by making light of three colors, i.e. R (red), G (green) and B (blue) incident on the reflection hologram original plate 1 simultaneously or successively in a desired order as the duplicating illuminating light 5 and using the same light of three colors as illuminating light for the display unit 6. It is also possible to record these images in a single color.

Although the hologram recording film and the recording method therefor according to the present invention have been described above on the basis of embodiments thereof, the present invention is not necessarily limited to the foregoing embodiments but can be modified in a variety of ways. It should be noted that the additional information pattern according to the present invention is not very good in visibility under a fluorescent light. Under a spotlight, however, the additional information pattern can be obtained as a latent image of excellent visibility.

It should be noted that variable information can be recorded as a Fraunhofer hologram by setting the relationship between the display unit 6, the projection optical system 7 and the volume hologram photosensitive material 4 as follows. The display unit 6 is disposed in the vicinity of the front focal plane of the projection optical system 7. The volume hologram photosensitive material 4 is disposed in the vicinity of the back focal plane of the projection optical system 7. Under these conditions, variable information is added by the setup as shown in FIG. 1, thereby allowing the variable information to be recorded as a Fraunhofer hologram. The hologram recorded by the above-described setup does not permit recognition of the contents of the record under a spotlight but allows the recorded variable information to be reconstructed only by using a laser light source and a lens. Thus, the variable information recorded in the form of a Fraunhofer hologram is more difficult to detect. It is also possible to record variable information in the form of a machine-readable bar code or two-dimensional bit information.

As will be clear from the foregoing description, the hologram recording film with additional information and the recording method therefor according to the present invention provide the following advantages. Reflection type additional information is recorded so as to be reconstructable simultaneously in superimposition with a reconstructed image from a volume hologram. In addition, transmission type additional information that is in mirror image relation to the reflection type additional information is recorded so as to be reconstructable simultaneously in superimposition with the reconstructed image from the volume hologram. Therefore, the additional information is surely visible. In addition, the additional information can be recorded so as to be reconstructable at any desired position with respect to the hologram plane. Further, because the additional information is recorded as both reflection type and transmission type additional information, it becomes easy to judge whether the hologram product is authentic or not. Furthermore, the present invention allows additional information, e.g. individual information (variable information), to be recorded by making only a simple change to the setup used for the conventional hologram duplicating method.

The hologram recording film with additional information according to the present invention is usable as holograms in various fields, for example, a graphic art hologram, a hologram for ID card, a hologram for brand tag, a hologram for ID tag, and a hologram for certification.

What I claim is:

1. A hologram recording film with additional information, comprising:
    a reflection type volume hologram recorded in said hologram recording film;
    reflection type additional information recorded in said hologram recording film so as to be reconstructable simultaneously in superimposition with a reconstructed image from said volume hologram; and
    transmission type additional information that is in mirror image relation to said reflection type additional information, said transmission type additional information being recorded in said hologram recording film so as to be reconstructable simultaneously in superimposition with the reconstructed image from said volume hologram.

2. A hologram recording film with additional information according to claim 1, wherein said reflection type additional information and said transmission type additional information are recorded so as to be reconstructable at a position different from a hologram plane.

3. A hologram recording film with additional information according to claim 1, wherein said reflection type additional information and said transmission type additional information are recorded so as to be reconstructable at a same position as a hologram plane.

4. A hologram recording film with additional information according to any one of claims 1 to 3, which is recorded so that a full-color image is reconstructable.

5. A recording method for a hologram recording film with additional information, wherein a hologram photosensitive material is placed at a distance from a reflection type volume hologram original plate for forming an object image, and duplicating illuminating light for duplicating said reflection type volume hologram original plate is applied from a hologram photosensitive material side so that diffracted light from said reflection type volume hologram original plate and said duplicating illuminating light interfere with each other in said hologram photosensitive material, thereby recording a reflection type volume hologram in said hologram photosensitive material, said recording method comprising the steps of:
    disposing a mirror or a reflective diffuser on a part of said reflection type volume hologram original plate;
    applying projection light projecting an additional information pattern illuminated with light from a same light source as that of said duplicating illuminating light to said mirror or reflective diffuser through said hologram photosensitive material;
    allowing light reflected or diffused by said mirror or reflective diffuser and said duplicating illuminating light to interfere with each other in said hologram photosensitive material, thereby superimposedly recording a reflection hologram in said hologram photosensitive material; and
    allowing said projection light and said duplicating illuminating light to interfere with each other in said hologram photosensitive material, thereby superimposedly recording a transmission hologram in said hologram photosensitive material.

6. A recording method according to claim 5, wherein said reflection type volume hologram original plate is a multi-recorded hologram original plate having a plurality of juxtaposed holograms, said recording method comprising the steps of:
    disposing a mirror or a reflective diffuser on a part of each hologram of said reflection type volume hologram original plate;
    applying projection light projecting an additional information pattern illuminated with light from a same light source as that of said duplicating illuminating light to said mirror or reflective diffuser on a part of each hologram of said reflection type volume hologram original plate simultaneously through said hologram photosensitive material;
    allowing light reflected or diffused by said mirror or reflective diffuser of each hologram of said reflection type volume hologram original plate and said duplicating illuminating light to interfere with each other in said hologram photosensitive material, thereby superimposedly recording a reflection hologram in said hologram photosensitive material; and
    allowing said projection light and said duplicating illuminating light to interfere with each other in said hologram photosensitive material, thereby superimposedly recording a transmission hologram in said hologram photosensitive material.

* * * * *